June 7, 1932.  H. AYERS  1,861,896
WATER PURIFYING APPARATUS
Filed May 11, 1931   2 Sheets-Sheet 1

Inventor
HARRISON AYERS

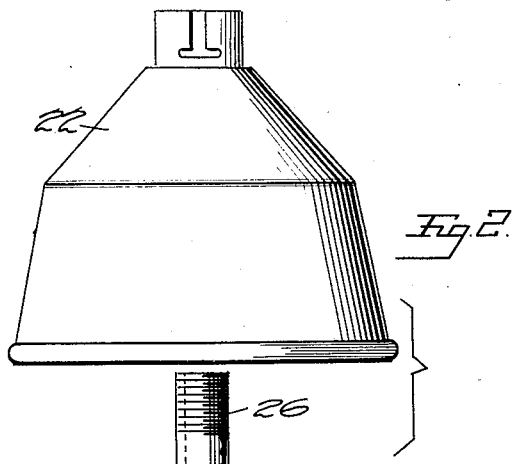
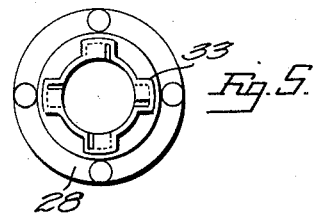
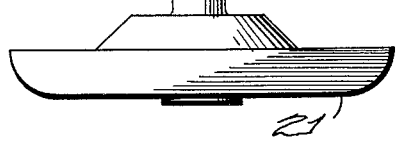
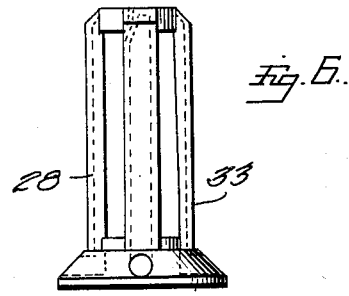
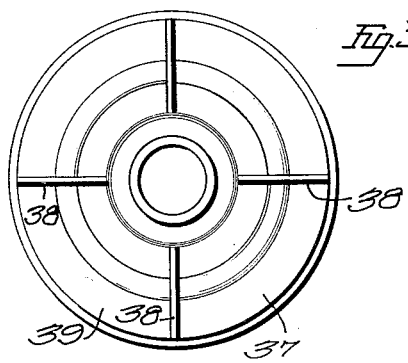
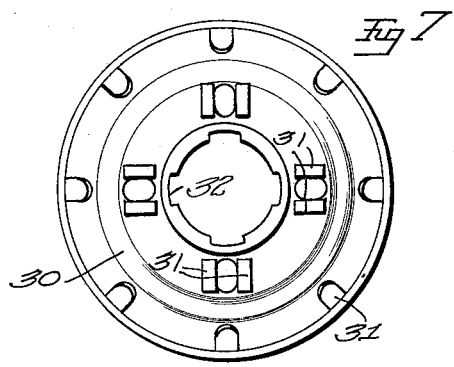
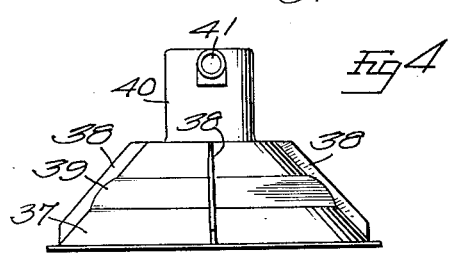
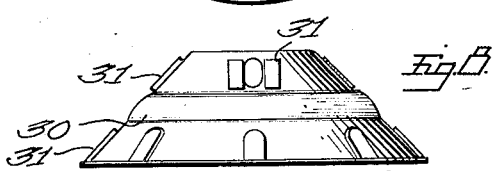
Inventor
HARRISON AYERS
By (signature)
Attorney Patented June 7, 1932

1,861,896

UNITED STATES PATENT OFFICE

HARRISON AYERS, OF NASHVILLE, TENNESSEE, ASSIGNOR OF ONE-HALF TO HENRY BURNLEY, OF NASHVILLE, TENNESSEE

WATER PURIFYING APPARATUS

Application filed May 11, 1931. Serial No. 536,619.

My invention relates to improvements in water purifying apparatus, and one object of my invention is the provision of an apparatus which will receive the water in its natural condition and subject it to an action which will entirely remove the dirt or foreign matter from the water and will discharge the clean or pure water and also the dirty or impure water in separate outlets, thus insuring the supply of perfectly clean and pure water for purpose of ice making, or for other purposes desired.

Another object of my invention is the provision of a water purifying apparatus which will be of small and compact dimensions to occupy a small amount of space, but which will have a large capacity performance to insure a large saving in the operation of the apparatus.

Another object of my invention is the provision of a water or liquid purifying apparatus which will be composed of comparatively few parts to insure a simple, strong and durable structure capable of withstanding hard and constant usage without fear of breakage or getting out of order of the parts.

Another object of my invention is the production of an apparatus of the character and for the purpose described which can be easily and quickly assembled or taken apart, which will permit access to its working elements when found necessary and which will require very little attention to insure its proper working.

Another object of my invention is the provision of a water or liquid purifying apparatus which will effect the separation and delivery of the clean or pure liquid and the impure or dirty liquid in a very rapid manner to insure a large supply of clean liquid and which apparatus can be manufactured at a low price to commend it as useful, desirable and practical in every particular.

With the attainment of these objects in view my invention consists of a water purifying apparatus embodying novel features of construction and combination of parts, substantially as described and defined by the claims and as shown in the accompanying drawings, in which:

Figure 2 represents a side view of the dome, base and connecting sleeve of the agitating member of my invention.

Figure 3 represents a top plan view of the upper cone or upper element forming a part of the agitator of the apparatus, and Figure 4 represents a side view of said upper member.

Figure 5 represents a top plan view of the guiding cage shaped member of my device which acts after the manner of a valve, and Figure 6 represents a side view of said member.

Figures 7 and 8 represent, respectively, a top plan view and a side view of the cone shaped agitating elements or members which form the main part of the agitator of my invention.

Referring by numerals to the drawings in which the same numbers of reference denote the same parts in all the views of the drawings:

Figure 1:
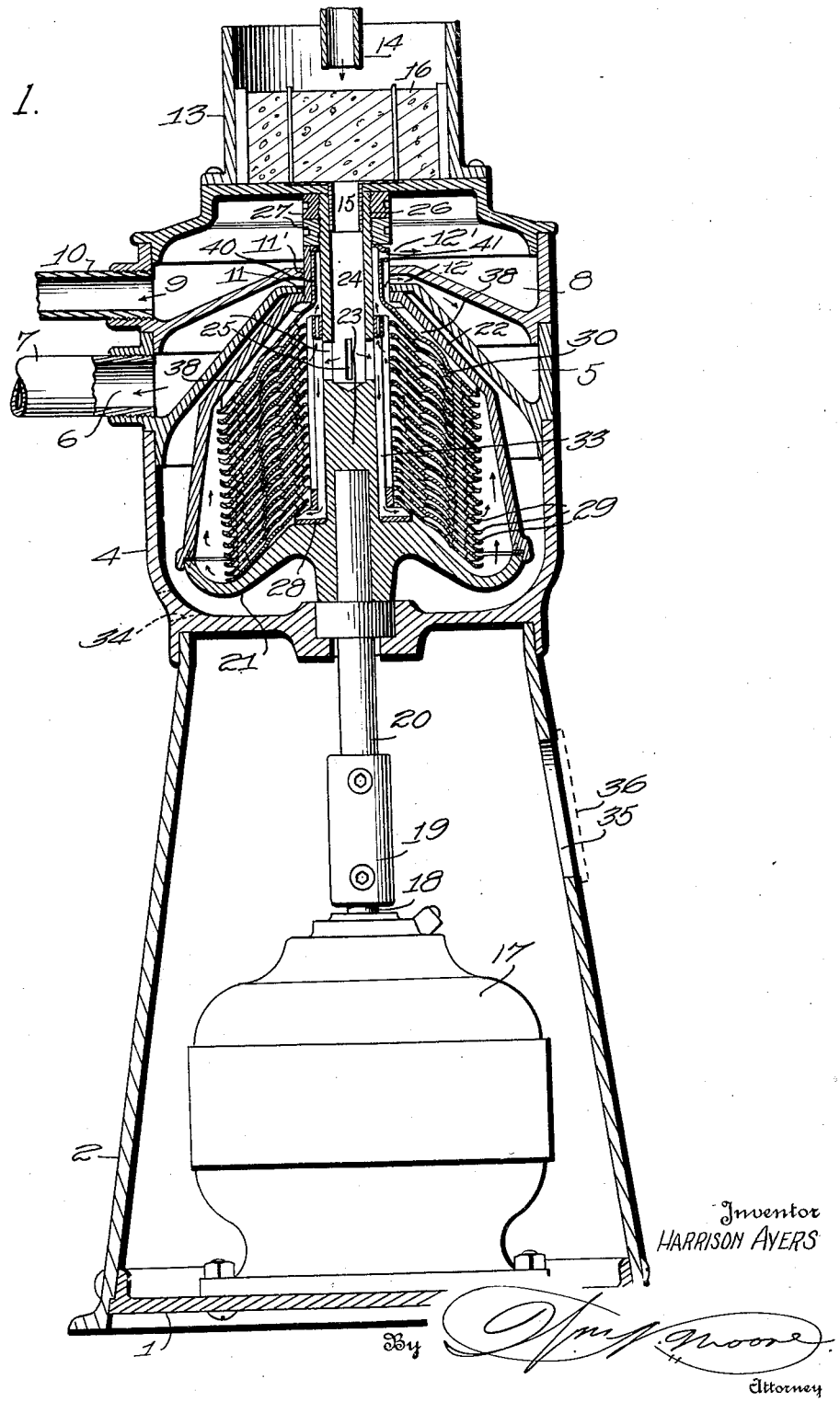
Figure 1 represents a vertical central sectional view of a water purifying apparatus constructed in accordance with and embodying my invention.

The numeral 1 designates the motor supporting bed or base, 2 the hollow pedestal or column rising from said base, 4 the casing or housing which encloses the main operating mechanism, 5 the hollow or chambered section fitted upon the main casing and having a pure water outlet 6, from which leads the delivery pipe 7, and on said pure water section is fitted the impure or dirty water section 8, having the outlet 9 and the discharge pipe 10, and said sections are each provided with a central opening 11 and 11', and with an outlet 12 and 12'.

From this construction it will be noted that the apparatus comprises a hollow pedestal, a main casing fitted thereon, a hollow section for pure water fitted upon the main casing, a hollow section for impure or dirty water fitted upon the pure water section, and upon the dirty water section is the water tank or container 13, receiving the water feed or inlet 14 and having a water discharge opening 15, and in said tank is the float or regulating element 16.

Upon the bed or base is mounted the vertical electric motor 17, having its shaft 18, coupled by the sleeve or joint 19, with the depending drive stud 20, of the agitator of my invention, which consists of the lower cup shaped portion 21, from which said drive stud 20, hangs, the dome 22, rising from said cup shaped member and the central post 23, which is formed with the upper hollow or chamber portion 24, which registers with the water inlet 15, and said post is also provided with discharge openings 25, and with the exteriorly threaded upper end 26, which receives the nuts 27, serving to hold the parts in proper relation.

From this construction it will be noted that the water from the tank or container passes down into the hollow upper end of the post of the agitator and out through the openings 25, and thence through the cage member 28, to the series of cone shaped plates 29, which form the main element of the agitator, and said plates are spaced apart by the raised rings 30, and the knobs or projections 31, and are retained in place by the series of kerfs or recesses 32, which fit upon the series of ribs 33, of said cage element and thus serve to hold the agitator in place.

The main casing is provided with a drain opening 34 and the hollow pedestal is formed with an opening 35, having a cover 36, and this opening allows access to the motor when found necessary for oiling, repairs or adjustments.

The operation of my apparatus will be readily understood from the drawings taken in connection with the description and the water enters from the feed or supply tank in the proper regulated amount and discharges into the upper hollow end of the central post of the agitator and passes out through the outlets in said hollow end of said post and through the gate and between the cone shaped plates of the agitator, the rotary action of which acts by centrifugal motion to separate the foul or dirty water from the pure water and causes the dirty water to pass out into the upper dirty water chamber and through its outlet and the pure water to pass into the pure water chamber or section and out through its discharge opening, to the destination for which it is to be used.

I have found from experience that my apparatus is very useful for supplying pure water for purposes of ice making or refrigeration and that the machine while of small and compact size is capable of supplying a large amount of pure water and that the centrifugal action of my apparatus effects a practical and perfect separation of the clean from the dirty water.

The apparatus can be easily taken apart or assembled for use, permits easy and ready access to its parts for cleaning, oiling or repair and in fact in all respects, the improvements provide a water purifying apparatus which will commend itself as useful, efficient and practical.

It will be seen that the upper cone shaped element of the agitator as shown in Figures 3 and 4, is different from the other members or elements, and said element 37, is formed with the ribs 38, the raised ring 39, the collar 49, which is formed with the outlet spout 41, which directs the water into the upper chamber or section, while the water passes through the cage and through the series of cone shaped elements, as shown by the arrows, effecting a proper separation.

It will be noted that the post upon which the agitator is mounted is formed with a shoulder to form a seat or support for the lower broad ring of the cage and that said post at its upper end is formed with screw threads which receive the pair of clamping nuts which serve to jamb and hold the parts firmly in position to insure the proper rotation of the agitator casing and the agitator within said casing, all of which provides a novel and improved structure.

One of the most important features of this invention is the detail construction of the agitator proper, which is composed of a series of cone shaped members which are flat throughout and are arranged in parallel spaced relation and formed with a circular raised ring and a series of projections which serve to retain the members in spaced relation while allowing free passage of water between said members and the upper member in the series is formed with a raised ring and also with a series of ribs, which ribs bear against the dome shaped or conical top of the said dome, and when the parts are assembled the members of the agitator are retained in proper place under the heavy rotation of the agitator.

Another important feature of this invention resides in the detail construction and arrangement of the parallel members of the agitator and the form of the top or upper member and the post which rises from the base or cup shaped portion of the agitator casing, which post has the shoulder which supports the series of agitator members and extends throughout practically the entire machine with its upper end resting on the bottom of the water supply tank and such post of uniform size throughout has at is upper end the exterior screw threads which are of sufficient length to receive the lower nut which clamps the agitator in place and also receive the upper jamb or lock nut which locks the clamping nut in place, and this is of great importance as the constant rotation of the agitator would loosen a single clamping nut and destroy the efficiency of the apparatus as well as entailing a considerable loss of time in making repairs or adjustments.

Another important feature of this apparatus is the detail construction of the motor shaft connection, by means of the sleeve or collar with the drive stud, which stud has its lower end secured in said connecting sleeve and its upper portion or end fitted in a socket in the cup shaped lower portion of the agitator casing, while intermediate its length said drive stud is formed with a flange or collar forming a broad and steady bearing in the base of the main casing, as shown in Figure 1 and this is vital in securing a broad table for the agitator casing to revolve upon.

Another important feature of my invention resides in the construction of the drive connection with the motor having the intermediate bearing ring or collar and in the form of the bearing in the lower wall of the lower or main section of the housing of the apparatus, and with the mounting of the upper end of said drive connection in the socket in the depending central hub upon the cup shaped base of the agitator casing, as this construction gives the connection a firm, steady and reliable bearing in the agitator casing and the casing and insures the rotation of the agitator casing in a smooth, true and properly balanced manner.

I claim:

1. A water purifying apparatus, comprising a liquid supply tank, a dirty water chamber having an outlet, a clean water chamber having an outlet, an agitator casing comprising an upper dome shaped portion having its top cone shaped or inclined, a cup shaped base portion having a post of uniform size rising therefrom and extending throughout the machine to the base of the supply tank, said post having a shoulder at its base, a series of side water outlets, a water receiving chamber in its upper end and exterior screw threads at its upper end, a cage surrounding said post with its lower portion resting on the shoulder of said post, an agitator fitting on said post and engaging said cage, said agitator comprising a series of cone shaped members having projections and a ring for retaining said members in spaced parallel relation and the upper member of said series having a raised ring and a series of ribs bearing against the inclined inner wall of the top of the dome of the casing, a clamping nut on the threaded end of said post to retain the dome and agitator in place, a lock nut on said threaded end of the post to lock said clamping nut, and a motor connected with the lower cup shaped portion of the agitator casing for rotating said casing and agitator.

2. A water purifying apparatus, comprising a supporting base, a hollow pedestal mounted on said base, an agitator casing mounted on said pedestal and having a central opening and a surrounding enlarged bearing in its lower wall or bottom, a clean and dirty water section mounted in proper relation to said main agitator casing and formed each with an outlet, a water supply tank surmounting said sections and having a discharge pipe depending therefrom, a motor mounted upon the base of the apparatus, a vertical drive shaft extending above said motor, a drive connection having its lower end connected with said extended end of the motor drive shaft, a flange or collar upon said drive connection intermediate its length and bearing in the enlarged bearing in the lower wall of the agitator casing and having its upper end projecting into said main casing, an agitator casing having a cup shaped base portion having a central depending hub formed with a socket to receive the upper end of said drive connection and further formed with a central post rising to the bottom of the supply tank and formed with a water receiving passage and side water outlets, a dome shaped upper member of said agitator casing having an inclined top, a cage mounted upon said vertical post, and an agitator proper composed of a series of cone shaped members having each a raised ring and a series of projections to retain the members in parallel relation, the upper member in said series having a series of ribs to bear against the inclined top of the dome, and clamping and locking means upon said vertical post to retain the casing and agitator in place.

In testimony whereof I affix my signature.

HARRISON AYERS.